United States Patent [19]

Schuller et al.

[11] 3,767,865

[45] Oct. 23, 1973

[54] HIGH SPEED FOIL DISC RECORDING SYSTEMS

[75] Inventors: Eduard Schuller, Wedel/Holstein; Gerhard Dickopp, Wolfgang Rainer, both of Berlin, all of Germany

[73] Assignee: Licentia Patent-Verwaltungs-GmbH, Frankfurt, Germany

[22] Filed: Dec. 22, 1970

[21] Appl. No.: 100,724

[30] Foreign Application Priority Data

Dec. 23, 1969 Germany.................. P 19 65 788.4

[52] U.S. Cl.. 179/100.4 R, 274/42 R, 340/174.1 E

[51] Int. Cl. ............................................ G11b 3/70

[58] Field of Search .............. 274/39 R, 42 R, 41.6; 340/174.1 E

[56] References Cited

UNITED STATES PATENTS 3,191,179 6/1965 Pelech et al................. 340/174.1 E

*Primary Examiner*—Raymond F. Cardillo, Jr.
*Attorney*—Spencer & Kaye

[57] ABSTRACT

In a system employing a thin foil disc carrying recorded information signals and rotating at a high speed above a stationary support from which it is separated by a stabilizing air cushion and in which an electrostatic charge is formed on the disc, means for substantially preventing the formation of an induced opposite polarity charge at the surface of the support which faces the disc.

6 Claims, 3 Drawing Figures

PATENTED OCT 23 1973 3,767,865

*Inventors.*
Eduard Schüller
Gerhard Dickopp
Wolfgang Rainer

BY *Spencer & Kaye*
ATTORNEYS.

HIGH SPEED FOIL DISC RECORDING SYSTEMS

BACKGROUND OF THE INVENTION

The present invention relates to foil discs and apparatus for playing them, particularly of the type using a mechanical transducer.

There have recently been disclosed techniques for using phonograph-record-like recording carriers for recording and/or playing back broad signal frequency bands, particularly television signals. These carriers consist of a non-conductive material and have the thickness of a foil. These foils may contain a magnetizable substance or may be coated with a coating which contains such a substance. However, they may also bear the signal recording in a groove whose spatial deformations, or undulations, which correspond to the signal, are converted to an electrical signal by direct pressure scanning.

Such a system is disclosed in U.S. Pat. application, Ser. No. 798,709, filed by Gerhard Dickopp, Hans-Joachim Klemp, Horst Redlich and Eduard Schuller on Feb. 12th, 1969, now U.S. Pat. No. 3,652,809 issued Mar. 28th, 1972 and assigned to the assignee of the present application. In that system, the scanner serves as a pressure receiver which is excited by a pressure force whose time variation coincides with the deformations, the pressure receiver being provided in the form of a transducer element which is compressed in the direction of such pressure force and the contact is direct or via a substantially rigid coupling piece, e.g. a diamond or sapphire. Preferably the elastic deformation of the carrier surface which is produced by the pressure force should be substantially greater than the oppositely directed deflection of the contact surface of the scanner due to the reactive force exerted by the compressed carrier material.

Finally, according to a further, older, proposal, disclosed in U.S. Pat. application Ser. No. 5,341, filed by Gerhard Dickopp on Jan. 23rd, 1970, and also assigned to the same assignee as the present application, the signal recording present as undulations in a groove can also be optically scanned.

All high density recording systems which employ a disc-type carrier having the form of a thin foil have in common the difficulty that it is necessary, due to the small size of the carrier areas containing the signal increments, to maintain a foil movement which is extremely smooth and uniform, and as free as possible from vertical wobble.

It is also known in this connection to support the foil, which is connected at its center with a drive shaft and which rotates at a relatively high speed, not on a turntable which rotates together with the foil, but rather to have the foil rotate freely in space so that the substantial centripetal forces thus developed, i.e. pulling forces which act from the edge toward the center, serve to stabilize the carrier.

It is also known to have such foils rotate at a slight distance above a stationary stabilization plate so that an air cushion is formed by the air flowing outwardly between the stabilization plate and the foil. The foil rotates on this cushion without friction therewith and the distance of the foil from the stabilization plate is determined by the flow conditions. It has also been proposed to design the stabilization plate to be curved with the foil following the outline of this curvature. This is disclosed in U.S. Pat. application, Ser. No. 802,858, filed by Eduard Schuller on Feb. 27th, 1969, now U.S. Pat. No. 3,603,742, issued Sept. 7th, 1971 and also assigned to the assignee of the present application.

The playback devices which employ an air cushion formed in the above-described manner between the foil and the support have proven to be particularly effective in preventing vertical movements, or fluttering, of the foil.

Practical experiments which were made with such foils over extended periods of time have shown, however, that these arrangements are not free from drawbacks. Occasional, sometimes periodic, contact of the foil with the support has been observed, as well as occasional adherence of the foil to the support, without the cause being initially evident.

Detailed research has lead to the discovery that these phenomena were caused mainly by electrostatic charges which formed on the electrically nonconductive carrier, i.e. the foil, and which formed a corresponding induced charge of opposite polarity on the surface of the support, the oppositely charged bodies attracting one another.

SUMMARY OF THE INVENTION

It is the primary object of the present invention to substantially eliminate such malfunctions and to assure smooth and regular movement of the recording carrier, or record disc.

These and other objects according to the invention are achieved, in an arrangement for playing back signals recorded on a phonograph-record-like recording carrier having the form of a thin foil and consisting of an electrically nonconductive material and including rotating means for rotating the carrier and a stationary, planar or curved support from which the carrier is separated during its movement by a layer of air, by the provision of means which solve the above problem by substantially preventing the formation of a corresponding induced charge on the surface of the support and thus adherence of the carrier to the support when the carrier is electrostatically charged, and thus prevent the formation of an electric field within the layer of air which would cause the carrier to be attracted to, and adhere to, the support.

In a preferred embodiment of an arrangement according to the present invention, the support, or at least a sufficiently thick layer thereof facing the underside of the carrier, is made of an insulating material. The support, however, may also be made entirely of insulating material. If an electrostatic charge then forms on the recording carrier the counterpole, i.e. the non-insulating part of the support, on which a corresponding induced charge can be produced is then so far removed from the carrier that the field intensity, and thus the electrostatic attraction forces, are correspondingly reduced so that no interference with the uniform movement of the carrier occurs.

The objects according to the present invention are also achieved by a novel carrier for use in an arrangement including a metallic stationary support, the underside of the carrier being coated with a conductive material. Practical experience has shown that this construction completely eliminates the previously observed malfunctions because the occasional and insignificant contact between the metallized underside of the recording carrier and the metallic stationary support can not produce any potential differences between these two parts.

In a particular embodiment of such a carrier, its metallic body is arranged to conductively contact a follower part of the rotating means of the associated playback system, which part forms a force-transmitting coupling with the carrier. Such a conductive connection of the follower part with the metallic body can prevent a potential difference from appearing between the rotating body and the stationary support.

The occurrence of an electrostatic charge in the carrier and the reduction or removal of the resulting malfunctions by the present invention can be explained as follows: At its surface remote from the stationary support, the recording carrier comes in contact, during mechanical scanning, or playback, with the tip of a scanning stylus, e.g. of diamond or sapphire. The friction between the two relatively moving parts, i.e. the recording carrier and the scanning stylus, generates an electrostatic charge in the recording carrier. This surface charge can be dissapated only very slowly because of the high insulating capability of the materials usually employed for the carrier, e.g. polyvinyl chloride or polyester. If the above-mentioned stationary support is of metal, a corresponding induced charge of opposite polarity is produced therein. This produces an electrostatic attraction between the recording carrier and the support which may cause the foil-thin recording carrier to adhere to the support so that its movement is impeded.

The occurrence of such an electrostatic charge is not limited to mechanical scanning processes because magnetic or optical playback generally also requires a guide element which moves in the groove of the recording carrier to bring the nonmechanical scanning member into the correct spatial position with respect to the portion of the foil surface to be scanned. The friction produced between such guide element and the recording carrier also leads to the above-mentioned electrostatic charge.

If, according to the invention, the side of the foil-thin recording carrier which faces the stationary support is provided with a conductive layer, e.g. a vapor-deposited metal layer, the corresponding induced charge at the surface of the stationary support flows onto this conductive layer, because the induced charge is attracted by the charge at the upper surface of the carrier, as soon as an electrically conductive connection is produced by at least temporary contact between the conductive layer and the stationary support. This eliminates the potential difference between the conductive layer and the support.

It is also possible to achieve a continuous potential neutralization by providing a continuous contact between a part of the conductive layer and the follower part of the rotating device. This removes the electrostatic field from the space between the underside of the recording carrier and the stationary metallic support so that an attraction between the recording carrier and the support can no longer occur.

When such a recording carrier has its underside provided with a conductive layer, there results the further favorable effect that the charge generated by friction and the corresponding opposite polarity induced charge in the conductive layer offset one another in their effect on the surrounding space so that even after the recording carrier is removed from the playback instrument, there will be no attraction of dust particles and thus no soiling of the carrier surface.

The arrangement is particularly favorable when the stationary support, or at least a layer thereof adjacent to its surface, is made of the same material as the carrier foil. In a preferred embodiment of a recording carrier according to the invention, this carrier consists of a transparent foil material and, instead of a vapor-deposited metal layer, its underside is provided with a coating of a conductive paint or colored lacquer. This conductive layer may be applied in a printing process and different colors can be employed to present letters or pictures which identify the recording carrier.

The other above-mentioned possibility according to the present invention, to produce the support, or at least a sufficiently thick layer thereof at the side facing the underside of the carrier, of an insulating material, has the effect that the formation of a corresponding induced charge on the upper side of the support is also substantially prevented. There thus also occur no interfering attraction forces between the recording carrier and the support. However, it must still be assured that the air cushion between the recording carrier and the support is not interrupted during playback since such interruption would permit a frictionally produced electrostatic charge to develop between the moving parts through contact of the recording carrier with the support and this would again lead to undesirable malfunctions such as adherence of the recording carrier to the support. Practical experiments have shown, however, that in many cases making the support of insulating material will be sufficient to prevent these malfunctions.

DESCRIPTION OF THE PREFERRED EMBODIMENTS

Figure 1:
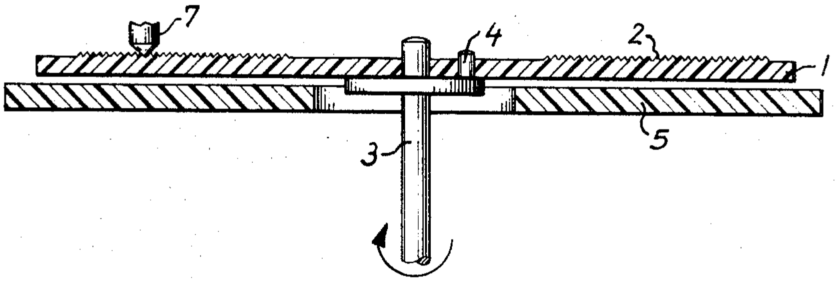
FIG. 1 is an elevational cross-sectional view of one embodiment of the present invention for the mechanical scanning of recording carrier foil which can be rotated, a sufficiently thick layer of the support facing the underside of the recording carrier being made of an insulating material and the thickness of the carrier being exaggerated.

In the embodiment illustrated in FIG. 1, the recording carrier 1 having the thickness of a foil and consisting of an electrically nonconductive material is provided with a spiral groove which covers the major portion of its upper surface and in which the signals are recorded in the form of spatial undulations. The recording employed may be, for example, of the hill-and-dale type known in the phonograph record art where a triangular stylus moves along the groove and its associated transducer produces an output proportional to the vertical excursions of the undulations.

The recording carrier 1 is caused to rotate rapidly above a stationary support 5 with the aid of a rotating shaft 3 and a follower part 4 in positive engagement with the carrier, so that a substantial outward flow of air is produced between the support 5 and the underside of the carrier 1, the rotating carrier acting like an air centrifuge. The air forming the outward flow is introduced into the region between the carrier and the support through a center hole provided in support 5.

A mechanical pickup 7 moves in the groove 2 of the recording carrier 1, the tip of the pickup consisting of a diamond or sapphire stylus which is guided in the groove. Primarily because of friction, between the carrier and the pickup tip, an electrostatic charge is formed on the insulating recording carrier 1 as already explained.

In the arrangement of FIG. 1, the support 5 is made of an insulating material. Because of the high electrical resistivity of the support material there will be practically no formation of a corresponding opposite polarity induced charge in the support. However, there will occur within the support material an electric polarization which can also lead to an attraction force between carrier 1 and support 5, which force is smaller than that which would exist if the carrier were of conductive material. This attraction force is directly proportional to the dielectric constant of the support material and thus becomes smaller as the dielectric constant is made lower. In any case, however, an insulating support presents an improvement as compared to a metallic support since metal behaves electrostatically like a material with an infinitely large dielectric constant.

Figure 2:
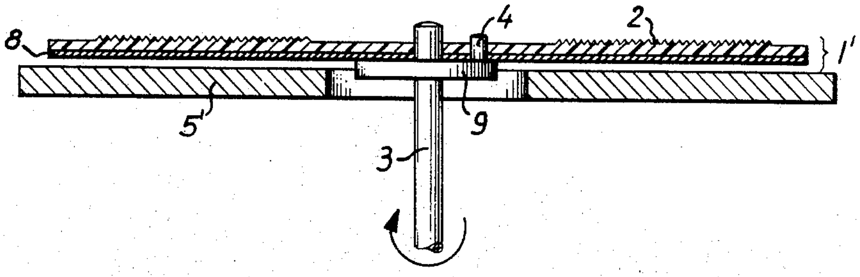
FIG. 2 is a view similar to that of FIG. 1 of another embodiment of the invention.

FIG. 2 shows a corresponding arrangement which differs from that of FIG. 1 only in that support 5' may be made of metal and carrier 1' is covered on its underside with a coating 8 of a conductive material. The coating may be a thin metal layer or a conductive paint or lacquer layer. As is shown, the coating 8 is in direct contact on the underside of the foil with the rotating assembly via the follower disc 9. This assures a conductive connection, via follower disc 9, from layer 8 and rotating shaft 3 to ground or to the mass to which the metallic support 5' is also connected.

Figure 3:
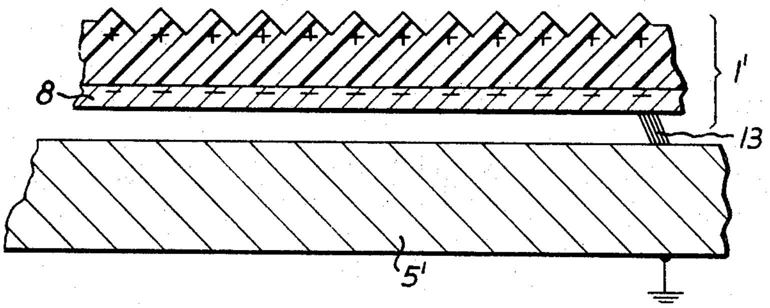
FIG. 3 is a cross-sectional, detail view, to an enlarged scale, of another embodiment of the invention composed of a recording carrier provided on its underside with an electrically conductive layer which rests on the air cushion at a slight distance from the upper surface of the stationary metallic support.

FIG. 3 shows, to an enlarged scale, a section through a portion of the recording carrier 1' which is provided on its underside with a conductive layer 8 and rotates at a distance determined by the air cushion above the metallic support 5'. A series of plus signs (+) at that surface of the recording carrier 1' which bears the grooves indicates that friction has there produced a positive electrostatic charge. A series of minus signs (−) indicate that a corresponding negative induced charge is produced in the conductive layer 8. Since the recording carrier 1' only has the thickness of a foil, the electric field of these two groups of charges reaching into the area surrounding the carrier is rather small because the distances between the two planes in which the charges exist is also very small.

A connection 13 schematically illustrated between the conductive layer 8 and the also conductive support 5' indicates that occasional contact or even the intentional grounding shown in FIG. 2 may cause the electrons necessary to form the negative induced charge to reach the conductive layer 8 on the underside of the foil, as was already mentioned.

The utilization of the present invention has proven to be particularly advantageous for recording television signals on phonograph-record-like carriers having a foil thickness where approximately 50 to 100 grooves take up 1 mm of the disc radius and the wavelengths of the recorded signals lie in the order of magnitudes of a few $\mu$ (microns). The conditions for satisfactory image reproduction from such a record result in high demands with respect to a precisely balanced movement of the record carrier. Irregularities in the movement, as they might occur because of electrostatic charges, and the forces produced thereby must be carefully avoided and are avoided to a great extent by arrangements according to the invention.

Examples of materials which can serve as the conductive layer 8 of the record foil disc according to the invention are chromium, nickel and silver. The disc may be coated with these metals by cathodic sputtering. The suitable thickness of the layer is about 100 to 500 A. Another example of the material for the conductive layer 8 is a conductive varnish, for example, "Leitlack M 9402" with "ZW-Verdunnung 20–101" of the firm "Zoellner-Werke," 1 Berlin 47, Gradestr. 60 – 72. The suitable thickness of this layer is about 0.01 to 0.1 mm.

The support plate 5 may be of polystyrol (resistivity $10^{17}$ to $10^{18}\omega$cm), polytetrafluorethylene (resistivity: $10^{19}\omega$cm), or polyethylene (resistivity: $10^{17}$ $\omega$cm). The relative dielectric constant of these materials is about 2 to 2.5. A support plate with a less relative dielectric constant of about 1 to 2 can be made of foamed materials for example foamed polystyrol or foamed polyurethan.

When the entire plate is not made of insulating material, the thickness of the insulating material may be 1 to 5 mm.

It will be understood that the above description of the present invention is susceptible to various modifications, changes and adaptations, and the same are intended to be comprehended within the meaning and range of equivalents of the appended claims.

We claim:

1. In a system for playing a thin, flexible record foil disc one surface of which is of electrical insulating material and carries recorded information, which system includes a stationary support plate, means contacting the one surface of the disc, and means for rotating the disc about its axis adjacent the plate and relative to said contacting means and said plate, in such a manner that the disc is, during rotation, maintained spaced from said plate by a cushion of air, and an electrostatic charge is generated on the one surface of the disc, due at least in part to the resulting frictional movement between said contacting means and the disc, the improvement comprising: a body of insulating material constituting at least a layer of said plate at the side thereof adjacent the cushion of air for minimizing the charge induced at such side of the plate by said generated charge and thus minimizing the electrostatic forces tending to attract the disc to said plate.

2. In a system for playing a thin, flexible record foil disc one surface of which is of electrical insulating material and carries recorded information, which system includes a stationary support plate, means contacting the one surface of the disc, and means for rotating the disc about its axis adjacent the plate and relative to said contacting means and said plate, in such a manner that the disc is, during rotation, maintained spaced from said plate by a cushion of air, and an electrostatic charge is generated on the one surface of the disc, due at least in part to the resulting frictional movement between said contacting means and the disc, the improvement comprising: a layer of electrically conductive material constituting the other surface of the disc; and means conductively connecting said layer to a body constituting an electrical ground thereby substantially eliminating any potential difference between said layer and said plate and thus substantially eliminating the electrostatic force tending to attract the disc to said plate.

3. An arrangement as defined in claim 2 wherein said insulating material has a low dielectric constant.

4. An arrangement as defined in claim 2 wherein said insulating material is of the same composition as the one surface of the record disc.

5. An arrangement as defined in claim 2, wherein said means for rotating comprises a conductive material and forms a part of said connecting means.

6. An arrangement as defined in claim 2, wherein said plate comprises a conductive material and said connecting means connects said layer to said plate.

* * * * *